(12) United States Patent
Westerman et al.

(10) Patent No.: US 9,135,259 B2
(45) Date of Patent: Sep. 15, 2015

(54) MULTI-TENANCY STORAGE NODE

(71) Applicant: LinkedIn Corporation, Mountain View, CA (US)

(72) Inventors: Jemiah C. Westerman, Santa Clara, CA (US); Robert M. Schulman, Menlo Park, CA (US); Krishna P. P. Naga, Sunnyvale, CA (US); Aditya A. Auradkar, Fremont, CA (US)

(73) Assignee: LinkedIn Corporation, Mountain View, CA (US)

( * ) Notice: Subject to any disclaimer, the term of this patent is extended or adjusted under 35 U.S.C. 154(b) by 43 days.

(21) Appl. No.: 14/073,658

(22) Filed: Nov. 6, 2013

(65) Prior Publication Data
US 2015/0127611 A1    May 7, 2015

(51) Int. Cl.
*G06F 17/30* (2006.01)
(52) U.S. Cl.
CPC ............................. *G06F 17/30088* (2013.01)
(58) Field of Classification Search
USPC ........................ 707/610, 635, 637, 638, 639
See application file for complete search history.

(56) References Cited

U.S. PATENT DOCUMENTS

| | | | | |
|---|---|---|---|---|
| 7,707,184 | B1 * | 4/2010 | Zhang et al. | 707/645 |
| 2008/0097995 | A1 * | 4/2008 | Dias et al. | 707/8 |
| 2010/0145909 | A1 * | 6/2010 | Ngo | 707/611 |
| 2011/0258041 | A1 * | 10/2011 | Ioffe et al. | 705/14.46 |
| 2012/0022910 | A1 * | 1/2012 | Chi et al. | 705/7.22 |
| 2012/0166390 | A1 * | 6/2012 | Merriman et al. | 707/613 |
| 2012/0310975 | A1 * | 12/2012 | Oliver et al. | 707/769 |
| 2013/0006938 | A1 * | 1/2013 | Prahlad et al. | 707/639 |
| 2013/0042087 | A1 * | 2/2013 | Shah et al. | 711/173 |
| 2013/0066837 | A1 * | 3/2013 | Colrain et al. | 707/674 |
| 2013/0138618 | A1 * | 5/2013 | Chatley et al. | 707/694 |
| 2013/0227091 | A1 * | 8/2013 | Tompkins | 709/220 |
| 2013/0297655 | A1 * | 11/2013 | Narasayya et al. | 707/791 |
| 2014/0181295 | A1 * | 6/2014 | Hindawi et al. | 709/224 |
| 2015/0019909 | A1 * | 1/2015 | Griffith et al. | 714/15 |

* cited by examiner

*Primary Examiner* — Hosain Alam
*Assistant Examiner* — Ahmed Abraham
(74) *Attorney, Agent, or Firm* — Park, Vaughan, Fleming & Dowler LLP

(57) ABSTRACT

A multi-tenancy storage node is provided. The storage node hosts partitions of multiple databases accessed by multiple applications. Each database is governed by a corresponding service-level agreement (SLA) or policy that specifies a maximum load or level of operation of the database in terms of one or more metrics (e.g., number or frequency of reads/writes, maximum size of reads/writes). To determine whether another database can be hosted by the node, a snapshot of the node's database operations is replayed on a test node, along with operations that exercise the other database. If maximum thresholds of the node for the metrics are not exceeded, the other database can be added to the storage node. An SLA is generated for it automatically, based on the metrics it exhibited during the operations on the test node. The storage node may enforce the SLA by rate-limiting activity of one or more applications.

20 Claims, 4 Drawing Sheets

Test Node 230

Storage Node 200

MULTI-TENANCY STORAGE NODE

BACKGROUND

The disclosed embodiments relate to computer systems. In particular, a multi-tenancy storage node apparatus and a system and method for operating a multi-tenancy storage node are provided.

Traditionally, computer-based applications have been allocated dedicated resources, such as an entire computer server or system. In these traditional environments, it is easy to measure the application's use of those resources, because all resource consumption (e.g., storage space used, processor cycles expended, number of reads or writes) occurs in support of the application.

However, in a computing environment in which one system or site (e.g., one web site) provides or supports multiple applications, it may be inefficient to dedicate separate resources to each application either because an application might not use all of the resources, or because it is operationally expensive to run a cluster for each application. Because a given physical resource (e.g., storage space, processor, communication link) is shared among the applications, measuring each application's resource consumption and/or limiting an application's resource consumption is more difficult.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications. Thus, the present invention is not intended to be limited to the embodiments shown, but is to be accorded the widest scope consistent with the principles and features discussed herein.

In some embodiments, a multi-tenancy (or multi-tenant) storage node is provided for hosting data accessed by multiple applications, and/or a system and method for operating and/or supporting a multi-tenancy storage node. In these embodiments, each supported application accesses a separate collection of data (e.g., a separate database) that is stored on the storage node. Each data collection and, hence, the corresponding tenant application's data operations, are governed by a service-level agreement (SLA) that identifies a maximum level of usage of the storage node's resources that the application's data operations are permitted.

In different embodiments, the SLAs may encompass different metrics of the storage node that pertain to the application's data. An illustrative (but not limiting) list of metrics includes: maximum number of read operations, maximum number of write operations, maximum amount of data (e.g., measured in bytes) that may be read in a single request and/or over some time period, maximum amount of data that may be written, and maximum number of unique data (e.g., unique database keys, unique records) that may be accessed in a request. These metrics may be measured per second (or other time period), and may apply to the storage node's storage components (e.g., magnetic disk, optical disk, solid-state drive, memory) and/or communication links (e.g., network connection(s)).

A service-level agreement may also include latency and availability metrics for various operations, such as Get (a single row), Write, Query (an index lookup), and Multi-Get (multiple rows in one transaction). Those metrics serve as quality of service (QoS) promises to the application from the service provided by the storage node.

In some embodiments, an additional application's data and workload may be added to a multi-tenant storage node after profiling the application and modeling the new data operations along with those of the storage node's currently supported applications. If the existing applications are not negatively impacted by the additional load associated with the new application, an SLA for the new application can be automatically generated based on the modeling, and the new application's data is installed and operated subject to its SLA.

Figure 1:
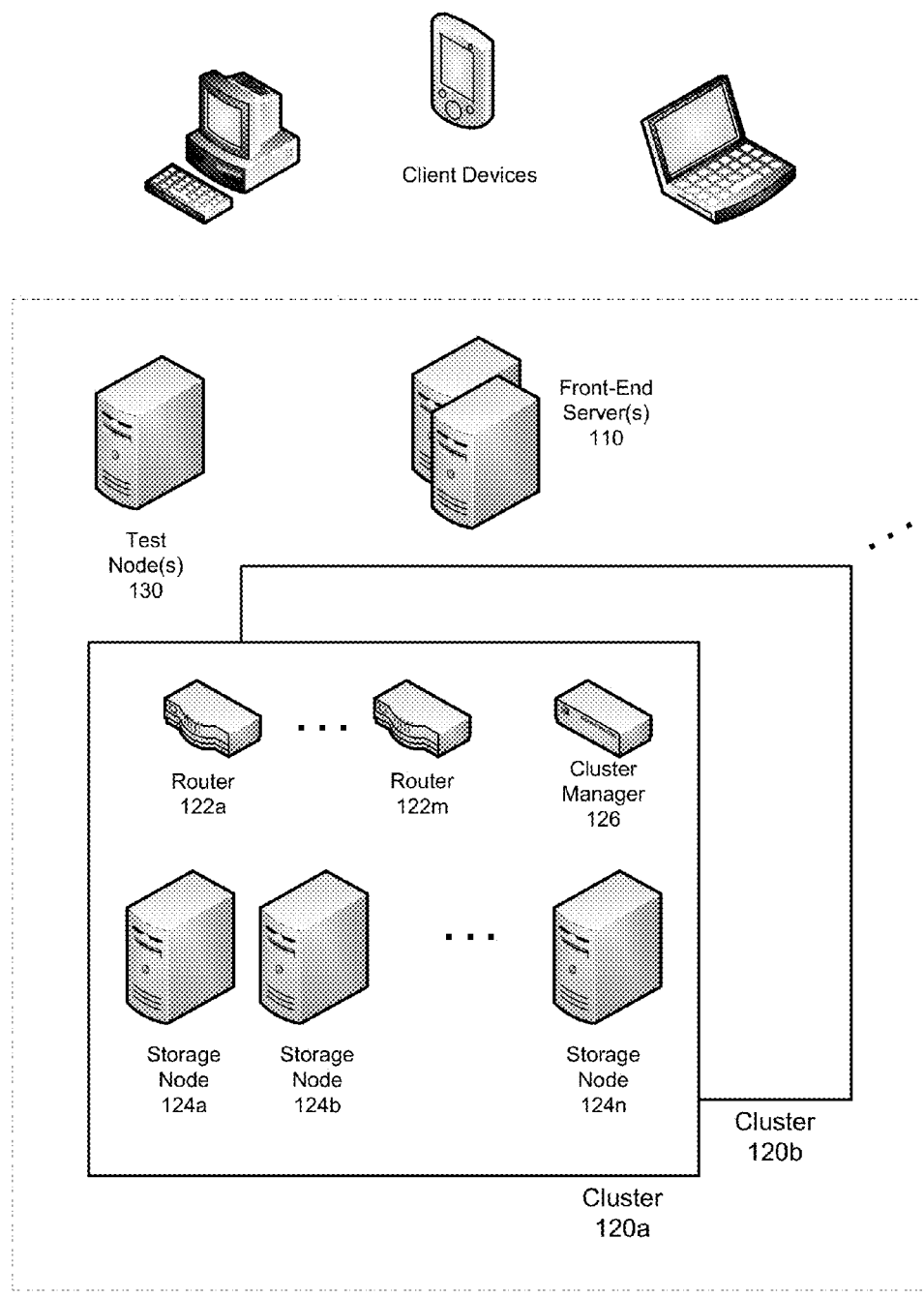
FIG. 1 is a block diagram depicting a computing environment that includes a multi-tenancy storage node, in accordance with some embodiments.

FIG. 1 is a block diagram depicting a computing environment that includes a multi-tenancy storage node, according to some embodiments.

System 100 hosts a web site and includes one or more front-end servers 110 (e.g., web servers) that receive connections from users who visit the web site. Users/members of the web site operate various client devices to access the web site, including stationary devices (e.g., desktop computers, workstations) and mobile devices (e.g., smart phones, portable computing devices). Different client devices (or types of devices) may access system 100 via different front-end servers, and may operate the same or different client software for accessing system 100 (e.g., a browser, a dedicated application).

Each of clusters 120 (e.g., cluster 120a, cluster 120b) hosts data used by one or more applications. Illustratively, each cluster hosts data of a different collection of applications, but each application may access any or all of the cluster's data collections.

The applications supported by a given cluster may include distinct applications (e.g., an electronic mail program, an instant messaging utility, a game, a media player) and/or separate use cases or features of the service(s) offered by system 100 (e.g., to display or edit a member profile, to select content to display to a member, to populate a content feed).

Therefore, as a user activates different features of the web site, navigates to different web pages, invokes different utilities, and so on, front-end server 110 and/or other system components communicate with clusters 120 to retrieve and/or store data for the activated applications. A client device may access data of more than one cluster during one visit to system 100.

Illustrative cluster 120a includes one or more routers 122 (e.g., routers 122a-122m), one or more storage nodes 124 (e.g., storage nodes 124a-124n), and cluster manager 126. Any or all separate components may have backups ready to take over in the event of a failure. Thus, the configuration of a cluster illustrated in FIG. 1 is not intended to reflect all embodiments, and clusters may have different configurations in other embodiments.

Within a given cluster 120, every storage node 124 supports the same applications (i.e., by managing data accessed by those applications), but each node may store a separate portion of the applications' data. In some specific implementations, each application supported by a cluster has one or more associated databases, and each storage node in that cluster maintains a separate portion of the hosted applications' databases.

For example, each application's database may be partitioned based on values in a key field of the database, and each storage node may store one or more partitions. Each node's partitions therefore comprise database records corresponding to a unique subset of the key field values. Key field values may map directly to corresponding storage nodes or may be hashed or otherwise processed in order to identify the responsible storage node.

Routers 122 route requests (e.g., queries, database updates) to the appropriate storage nodes, using routing tables generated by cluster manager 126. Separate routing tables may be derived for each application/database, or one routing table may encompass all databases.

As storage nodes are brought on-line or off-line, and when an application's data is partitioned or re-partitioned, cluster manager 126 updates its mapping of the application's data (e.g., key field values) to the specific storage nodes on which the data is stored. The routing table(s) it produces is/are distributed among the cluster's routers and, when a data request is received at a router 122 for a particular application, the router applies the routing table for that application to route the request to a storage node that can handle the request.

In the embodiment of FIG. 1, each of routers 122a-122m and cluster manager 126 are separate hardware components (e.g., computers, routers, controllers); in other embodiments, the cluster manager may operate on the same hardware component as a router 122 or a storage node 124.

System 100 also includes one or more test or development nodes 130. Test nodes 130 may have configurations similar to those of storage nodes 124, to allow benchmarking of storage node configurations, testing of data operations, development of service-level agreements, and/or other actions as described herein. In some embodiments, an entire cluster 120 may be configured and operated as a testing and/or development platform.

In some particular embodiments, system 100 hosts a professional social networking service or site that members use to create, develop and maintain professional (and personal) relationships. As part of the service, system 100 serves content for presentation to members via their client software, which may include content generated or suggested by other members (e.g., images, video, audio, messages), offers, advertisements, announcements, job listings, status updates, and so on.

To support the professional social networking service, system 100 may include various other components not depicted in FIG. 1. For example, a profile server may maintain profiles of members of the site in a profile database. An individual member's profile may reflect any number of attributes or characteristics of the member, including personal (e.g., gender, age or age range, interests, hobbies), professional (e.g., employment status, job title, functional area, employer, skills, endorsements, professional awards), social (e.g., organizations the user is a member of, geographic area of residence, friends), educational (e.g., degree(s), university attended, other training), etc.

Organizations may also be members of the service, and may have associated descriptions or profiles comprising attributes such as industry (e.g., information technology, manufacturing, finance), size, location, etc. An "organization" may be a company, a corporation, a partnership, a firm, a government agency or entity, a not-for-profit entity, or some other entity formed for a professional and/or social purpose.

Members of a site or service hosted by system 100 have corresponding pages (e.g., web pages, home pages), which they may use to facilitate their activities with the system and with each other, by initiating new relationships, sending and receiving communications with other members, browsing information disseminated by and/or concerning other members, etc. Profile data, members' individual pages, announcements and/or other information may be stored on one or more of clusters 120 or on some other component(s) of system 100.

Figure 2:
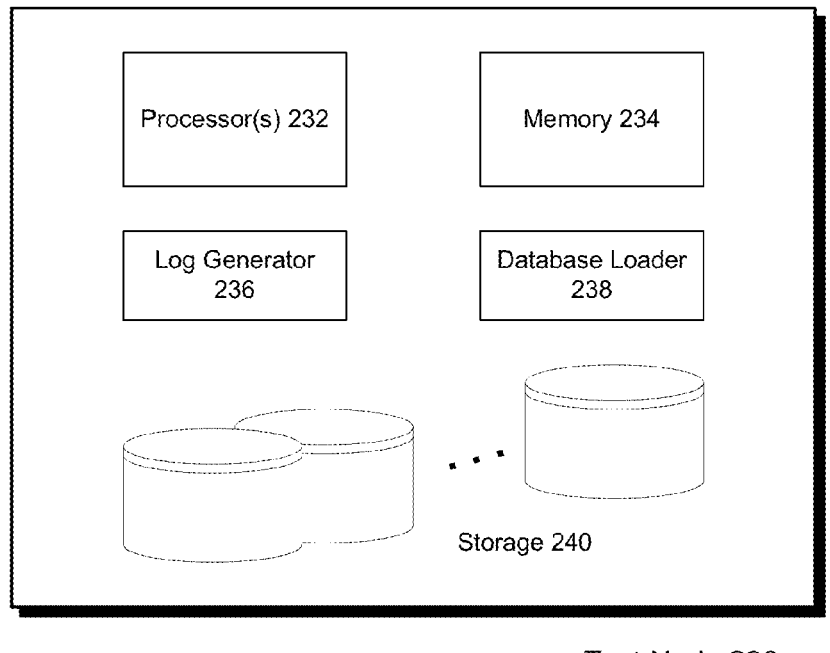
FIG. 2 is a block diagram depicting a multi-tenancy storage node and a test node, in accordance with some embodiments.
Figure 2:
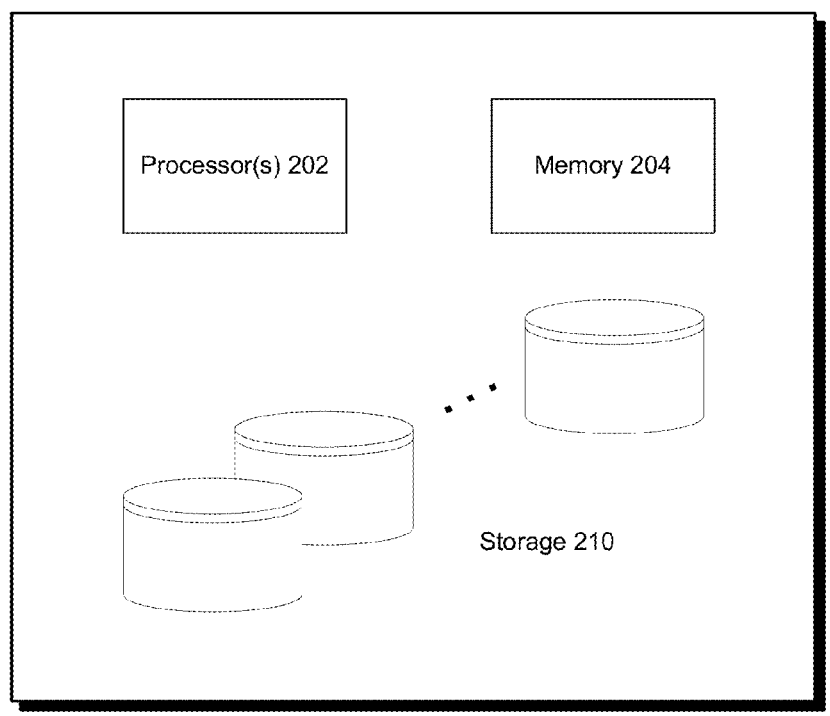

FIG. 2 is a block diagram of a multi-tenancy storage node and a test node, according to some embodiments. Storage node 200 includes one or more processors 202, memory 204 and one or more persistent storage devices 210. Illustrative storage devices include magnetic and optical disks, and solid-state drives.

Test node 230, which may be used as described herein for benchmarking a storage node, generating representative data operations, determining whether a new database or application may be added to a cluster, and/or used for other purposes, may be configured similarly or even identically to storage node 200. Test node 230 therefore includes one or more processors 232, memory 234 and one or more persistent storage devices 240.

Multi-tenancy storage node 200 is part of a cluster of storage nodes that store and manage data on behalf of multiple applications. Each application's database is partitioned, striped or otherwise divided across the storage nodes within the cluster. Thus, node 200 stores one or more partitions, stripes or other portions of one or more databases or other data collections accessed by the applications supported by the cluster. In different implementations, a storage node cluster may include different numbers of storage nodes. In an illustrative implementation, a cluster may include approximately ten to twenty storage nodes.

In some embodiments, storage node 200 hosts one or more instances of the open source MySQL™ database software to store the supported applications' data (e.g., one instance for each application database). The storage node also executes management software (e.g., written in Java®) for managing operation of the storage node. The database software and management software may be stored on storage devices 210 for loading into memory 204 for execution by processor(s) 202, or may be stored on another storage component that is not used to store the supported applications' data.

The applications supported by storage node 200 may present varying profiles regarding their transaction rates, the size of their data records, the ratio of read operations to write operations, the total number of records, etc. However, each application's data operations are governed by a database-specific (or application-specific) service level agreement (SLA) that limits the load the database (or application) may place on a storage node, in order to help ensure that data operations on a node do not exceed its physical limitations. The SLA may be drafted or formatted in terms of specific application-level metrics—such as a number of read/write operations, an amount of data read or written per second, a number of unique key field values (or records), etc. An SLA for a given database (or application) will usually be identical on each storage node within the cluster that hosts the database (or supports the application).

A given SLA may allow for special cases or patterns of data access. For example, one or more specific records or keys in a database may be particularly "hot," meaning that they are accessed (e.g., read) much more frequently than other records. The corresponding SLA may identify specific records as having laxer restrictions, may permit some maximum number of records to have secondary (e.g., higher) rates of access, or may allow for special cases in some other way.

Embodiments of the invention are described as they are implemented with database-specific SLAs. Therefore, each SLA implemented on storage node 200 pertains to one database hosted by the storage node, and limits its operations in terms of any of the various metrics described herein. The metrics thus act as proxies for the node's physical resources, so that there is no need to limit a database in terms of its usage of physical resources (e.g., storage space, processor cycles). As described further below, an SLA may be automatically generated for a database after determining an actual, simulated or expected workload that will be encountered by the database.

In these embodiments of the invention, each supported application has its own separate database instance on the storage node. In other embodiments, such as a computing environment in which multiple applications access a single database, application-specific SLAs may be used in place of database-specific SLAs, or the multiple applications may share a single database-specific SLA according to some agreement. A single development team is likely to be associated with all applications accessing a single database, and may therefore cooperate to divide the database's limitations among the multiple applications.

Within test node 230 in some embodiments of the invention, log generator module 236 creates a set of data operations for a candidate database to be added to a storage node cluster. In these embodiments, the log generator receives as input identities of data tables (and/or other data constructs) the data operations must access, a range of key values that will be accessed (e.g., to model one specific storage node having one assigned partition of the application's data), an expected distribution of operations (e.g., 95% reads, 5% writes), a range of sizes of records to be read or written, an operation density (e.g., X queries per second), etc. The log generator outputs a set of operations on those data tables that meets the specified criteria over some period of time (e.g., ten seconds, one minute).

Log generator 236 may be particularly useful when the application/database has not yet finished development but it is desirable to determine which storage node cluster it can or should be added to. The output of the log generator may be indistinguishable from a set of operations recorded from a live database (e.g., in terms of format, number of operations).

Database loader 238 of test node 230 operates to prepare a database for testing. For example, live data may be copied from storage node 200 and configured on storage devices 240 to support generation of data operations by log generator 236 and/or use of those data operations to determine whether a new database can be added to a cluster, as described below. Alternatively, one or more sets of test data may be accumulated over time for use in testing; the different sets of data may have different schema for supporting testing of different applications.

Figure 3:
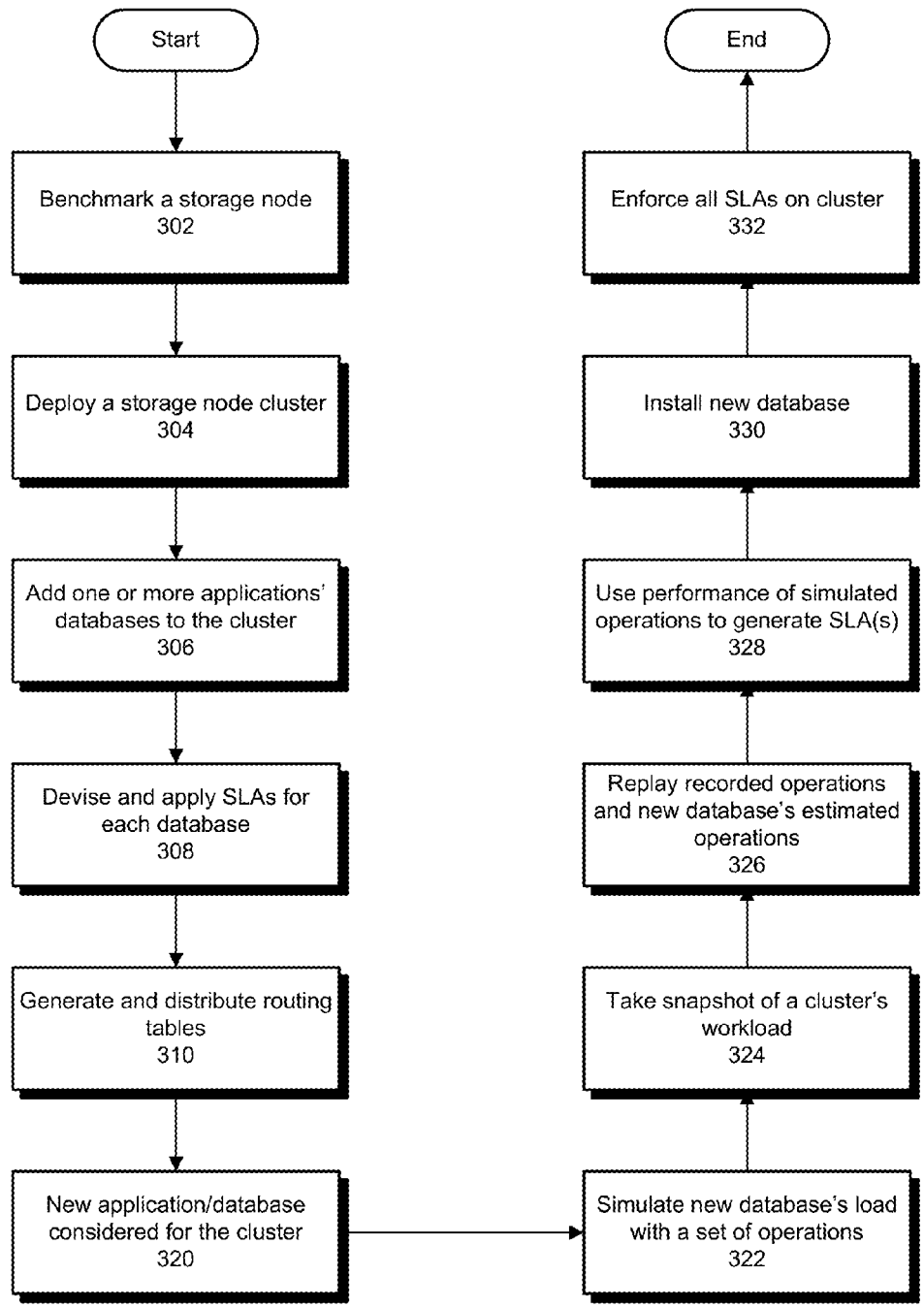
FIG. 3 is a flow chart demonstrating a method of operating a multi-tenancy storage node, in accordance with some embodiments.

FIG. 3 is a flow chart demonstrating a method of operating a multi-tenancy storage node, according to some embodiments. The operations reflected in FIG. 3 include adding a new application (and database) to the storage node while it is already hosting one or more databases.

In operation 302, benchmarks for the multi-tenancy or multi-tenant storage node are captured. The benchmarks may be obtained from a live storage node (i.e., in a production environment) or may be obtained from a similarly or identically configured node within a testing or development environment (e.g., test node 230 of FIG. 2 operating within a data lab).

The node is tested to determine its maximum operations in terms of all metrics that will be included in the SLAs that will be implemented. Thus, the node's maximum input/output rates (e.g., in bytes per second), maximum size of a read or write operation, maximum number of queries or other transactions, maximum number of open connections to a router or storage node, maximum number of rows/records accessed per second in read or write operations (optionally with multiple priority levels of connection pools per application), maximum number of reads/writes to the same key per second, maximum number of writes to an indexed field per second, and/or other relevant metrics are measured, in terms of the node's storage components, memory and/or network (or other communication link).

The benchmarks thus define the node's capacity. To provide some headroom or margin, the measured capacities may be decreased somewhat (e.g., by 10%) and/or a database's permitted operations as documented in its SLA may be adjusted somewhat (as described below). In present implementations, permitted operations of all databases installed on a storage node, as specified in their SLAs, should not exceed the node's benchmarked capacity.

In operation 304, a new cluster of storage nodes is deployed. Each node in the cluster is similar or identical to a benchmarked storage node. The cluster contains multiple nodes, and the actual number of nodes may differ from one embodiment to another. As one of ordinary skill in the art will appreciate, additional nodes may be added to a storage node cluster after the cluster is in operation. In this case, the databases hosted on the cluster may be repartitioned or their partitions may be redistributed among the cluster's storage nodes.

In operation 306, databases for one or more applications are installed on the new cluster. As described previously, each database may be partitioned or otherwise divided so that each storage node in the cluster is allocated or apportioned an approximately equal amount of data or number of partitions. For example, the number of likely or possible values of a key field of a database (or of a hash of the key field) may be divided by the number of storage nodes, and each node may be assigned one or more partitions comprising its share of all values.

Adding the first database or first few databases (e.g., two, three) to a new storage cluster may be relatively easy, especially if the combined load is not expected to approach the limits of a storage node. Alternatively, however, adding a new database may be more complicated, and may require modeling of the existing and new loads to determine whether the cluster can accommodate the new database, especially if at least one of the databases is (or is expected to be) used heavily. In operation 306, however, the databases that are added initially are installed without fear of overloading any storage nodes. For example, development teams responsible for the applications may have accurate models or operational statistics for the applications' databases, which describe their operations in terms of application-level metrics (e.g., queries per second, number of writes per second).

In operation 308, for each database installed on the storage node cluster in operation 306, a service level agreement (SLA) is applied. Illustratively, the SLAs for the first databases may involve observation of the databases in a testing or development environment that does or does not include the other databases installed in operation 306. In other words, the SLAs may reflect the applications' databases operating alone on a test server configured similarly or identical to the benchmarked storage node; alternatively (and as described below), terms of the SLAs may be derived from observation of the databases operating together with actual or simulated workloads.

Regardless of how the terms are derived, limits for each initial database's operations in terms of any number of application-level metrics are captured in their SLAs. In some implementations, each database's SLA is stored as a JSON (JavaScript Object Notation) snippet to be loaded when the database is provisioned.

In operation 310, a cluster manager or other cluster component generates one or more routing tables for the cluster's applications and databases, reflecting which data partitions are stored on which storage nodes. The routing tables are distributed to routers that will direct database operations to the storage nodes responsible for the affected data.

Thus, after operation 310, the storage node cluster is hosting one or more databases in support of corresponding applications, with each storage node responsible for some portion of each application's data. Each database's operations are governed by an SLA that prevents it from monopolizing a node's resources and/or negatively affecting any other database's operations.

In operation 320, a new application/database is nominated for addition to those already supported by the cluster.

In operation 322, a measurement or estimate of the candidate application's data operations is obtained or created. For example, the application's operation in a testing or development environment may be recorded or measured, an estimate may be assembled by the application's development team, a similar application's operation may be measured, etc. The measurement or estimate of the new application's workload is expressed in terms of one or more application-level metrics monitored by the storage node cluster.

In some embodiments of the method of FIG. 3, the new application is expressed as an actual or illustrative set of operations (e.g., reads and writes to the database, to memory, to a network link). For example, an actual set of operations exhibited by the application in testing or development is captured, or a set of operations believed to accurately represent the application's data operations may be assembled.

The new database's set of operations may be configured to encompass a predetermined amount of time (e.g., ten seconds, one minute) or a predetermined number or mix of operations, which may correspond to an average period of operation of the application, a peak period or some other period. In some implementations, multiple sets of operations are configured to represent different loads (e.g., peak, trough, average).

In operation 324, prior to installation of the new database on the cluster, a set of actual data operations conducted on an active storage node is captured. This may involve recording every transaction of the node's database partitions for some period of time (e.g., ten seconds, one minute), some predetermined number of operations, etc. The transactions may be recorded in a log file on the storage node, or may be dispatched over a network to a separate listener in order to avoid interference with the active storage node.

For each transaction, the time of the transaction (e.g., to the millisecond), the data operation (e.g., Get, Write), the affected database, the affected record, and/or other information is recorded. In particular, enough information about each operation is recorded so as to enable the system to recreate and replay the operation. Also, the length or duration of each transaction is recorded—meaning how long it took the cluster or storage node to satisfy the requested operation.

In some embodiments, operation 324 is repeated whenever a new application/database is considered for installation on the node's cluster, and may be performed on any number of nodes within the cluster. In some other embodiments, operation 324 is repeated on a regular or periodic basis, so as to have available multiple different snapshots of the cluster's or storage node's workload reflecting different days of the week, different times of the day, peak periods of activity of different applications/databases, etc.

In operation 326, the recorded snapshot of operations and the estimated or simulated set of operations of the candidate database are replayed together in a laboratory, testing or development environment that includes a computer node configured identically or similarly to the storage nodes of the cluster. In particular, the recorded snapshots are replayed in the same order and with the same timing, and the estimated or simulated operations are interlaced with the recorded operations.

The candidate database's operations may be evenly distributed among the actual, recorded, cluster operations (e.g., so that both sets of operations finish at approximately the same time) or may be merged in some other manner. For example, the difference between a timestamp of the first candidate database operation and a timestamp of the first recorded database operation may be applied to the candidate database questions (possibly with a slight offset), so that all databases' operations run together but with their natural timing.

While the operations are being run, the test/lab node's metrics are monitored just as the active storage nodes' metrics are monitored. If the measurements indicate that some limitation of the node was exceeded (e.g., maximum number of queries per second, maximum number of network write operations per second), the candidate application and database are rejected for this cluster, but may be considered with another cluster.

Similarly, response times of the replayed operations may be compared to the response times noted when the operations were originally performed in the production or live environment. The application/database may be rejected if the response times are worse (e.g., by some percentage) or if they violate an operative SLA. Response times might be measured as averages or some other metric, such as $99^{th}$ percentile, $99.9^{th}$ percentile, etc.

Operations 324 and 326 may be performed for any number of storage nodes within the storage node cluster; results of all tested nodes' performances may be averaged. In some implementations, operations 324 and 326 are performed for only one storage node within the cluster.

In operation 328, and assuming that no limitations of the cluster's storage nodes were exceeded during operation 326, parameters for one or more SLAs are captured from the simulation of operation 326. In particular, the metrics exhibited by the candidate database are captured and used as the basis for a new SLA for that database.

The metrics encompassed by the SLA may be boosted by some amount or some percentage (e.g., 10%) to provide some margin for different operation in the production environment (e.g., higher than expected demand for the application). If a margin is to be provided, that margin may be tested by simulating the extra (e.g., 10%) load—either during operation 326 or by performing operation 326 again with the margin to determine whether the proposed margin is feasible.

New/replacement SLAs may or may not be generated for the cluster's or node's existing databases. If new SLAs are not generated, those currently in effect remain in effect even after the new database is installed.

In operation 330, the new database is installed on the cluster, partitioned across all active storage nodes. Further, the cluster manager updates its routing table(s) to include the new database and distributes the tables to the cluster's routers.

In operation 332, all SLAs in effect on the cluster are enforced to ensure no application/database exceeds its permitted workload. In different embodiments, SLAs may be enforced differently.

In some embodiments, enforcement includes applying some form of "rate limiting" if and when a database's operations violate one or more terms of its SLA. For example, attempted connections to the cluster's storage nodes for the purpose of accessing the offending database may be limited. This scheme avoids incurring the additional operations that those connections would have required, without having to throttle or otherwise restrict an existing connection's behavior. Connections may be prioritized for purposes of rate limiting, perhaps based on the associated user, the type of operation(s) requested, and/or other criteria In some other embodiments, if an application or database violates its SLA, the entire cluster or the individual storage nodes that observe excess operations may begin returning error messages for some operations and/or rejecting some individual operations or requests. Whatever remedial action is taken may continue until the database or application is once again in compliance with its SLA After operation 332, the method ends.

In some embodiments of the invention, benchmarking and/or testing to determine whether a storage node or cluster can receive an additional database includes some form of data initialization. For example, data initialization may involve taking a snapshot of contents of one or more databases (e.g., all databases) on a storage node and copying those contents to the test node on which the benchmarking of operation 302 or the replay actions of operation 326 are performed.

An illustrative SLA for an application or database identifies any or all of the application-level metrics identified herein and, for each metric, a maximum that the application or database may exhibit. These maximum values may be absolutes, so that as soon as one is breached, remedial action is taken. Or, the values may be averages over some time period (e.g., one second, ten seconds), so that a value may be temporarily exceeded without remedial action as long as the average for the corresponding time period does not exceed the value.

Figure 4:
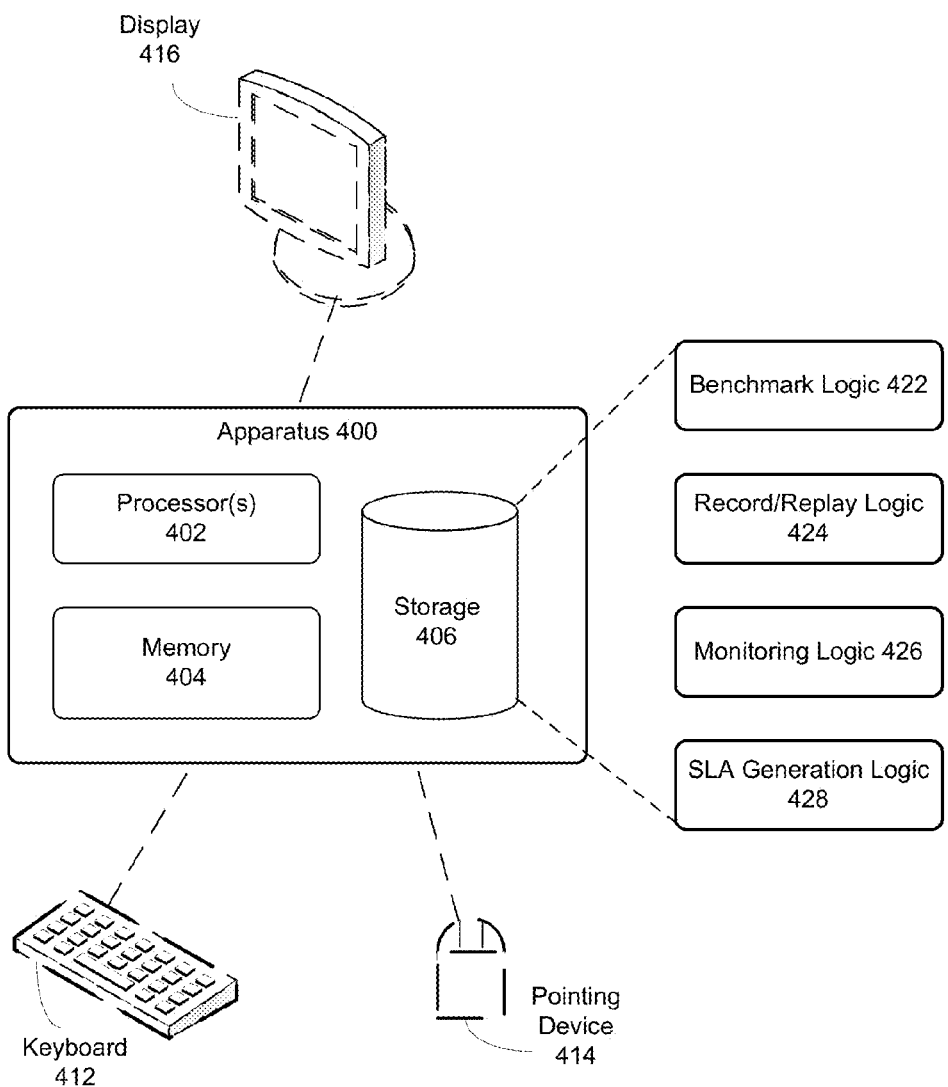
FIG. 4 is a block diagram of an apparatus for database testing and automatic SLA generation, in accordance with some embodiments.

FIG. 4 is a block diagram of an apparatus for benchmarking, testing and automatic SLA generation, according to some embodiments.

Apparatus 400 of FIG. 4 comprises processor(s) 402, memory 404 and storage 406, which may comprise one or more optical, solid-state and/or magnetic storage components. In these embodiments, the apparatus is configured similarly (or identically) to a live storage node that is being modeled or simulated (e.g., node 200 of FIG. 2), but operates in a testing or laboratory environment. Apparatus 400 may be coupled (permanently or transiently) to keyboard 412, pointing device 414 and display 416.

Storage 406 of the apparatus includes actual and/or simulated operations for all databases currently residing on the storage node being modeled, and possibly for a new database that is a candidate to be added to the modeled node's cluster. Storage 406 also stores logic that may be loaded into memory 404 for execution by processor(s) 402. Such logic includes benchmark logic 422, record/replay logic 424, monitoring logic 426, and SLA generation logic 428. In other embodiments, any or all of these logic modules or other content may be combined or divided to aggregate or separate their functionality as desired.

Benchmark logic 422 comprises processor-executable instructions for generating a benchmark for the modeled storage node, in terms of one or more application-level metrics. Illustratively, the same metrics used to benchmark the storage node may be used to define an SLA for one or more databases installed on the node.

Record/replay logic 424 comprises processor-executable instructions for recording actual or simulated data operations of databases and/or for replaying such operations. As described above, for example, when determining whether a candidate database can be added to the modeled storage node's cluster, data operations representing the existing and candidate databases are executed by logic 424 to determine whether the modeled storage node can support all of them simultaneously without exceeding any performance limitation.

Monitoring logic 426 comprises processor-executable instructions for monitoring data operations (e.g., operations replayed or simulated by logic 424, operations of a live storage node) to observe their metrics (e.g., reads per second, sizes of write operations), and possibly to compare those metrics to maximum permitted levels. Thus, monitoring logic 426 may be critical to the automatic development of an SLA for a candidate database that passes capacity testing. The SLA may simply adopt the monitored/observed metrics, for example, and monitoring logic 426 (or other logic) may monitor adherence to the SLA.

SLA generation logic 428 comprises processor-executable instructions for converting the metrics demonstrated by a candidate database (e.g., as observed by logic 426) into a service-level agreement that defines the database's maximum impact on the modeled storage node. Logic 428 may, for example, take the maximum observed value for a metric (e.g., X queries per second) and may or may not add a buffer (e.g., 5%, 10%) to obtain a metric-specific term of the SLA.

Apparatus 400 may include other logic, such as database loading logic for preparing (e.g., populating) one or more databases or database partitions for testing, enforcement logic for enforcing an SLA, etc.

Apparatus 400 may operate as part of, or in cooperation with, a system or cluster comprising storage nodes hosting portions of multiple databases accessed by different applications.

An environment in which some embodiments of the invention are executed may incorporate a general-purpose computer or a special-purpose device such as a hand-held computer or communication device, or a storage system such as an attached storage array. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method, comprising:
    recording a snapshot of database operations on a storage node hosting partitions of multiple databases, wherein separate service-level agreements (SLAs) for each database limit operations of the database according to a plurality of application-level metrics; on a test storage node: prior to said recording, benchmarking the test storage node to identify maximum thresholds associated with the storage node, wherein a hardware configuration of the test storage node is substantially identical to a hardware configuration of the storage node; after said recording, replaying the snapshot of database operations; while replaying the snapshot of database operations, executing an additional set of operations on an additional database installed on the test storage node but not installed on the storage node prior to said replaying;
    determining whether the application-level metrics exhibited by the test storage node during said replaying exceed the maximum thresholds associated with the storage node; and
    automatically generating an additional SLA for the additional database, based on metrics exhibited by the additional database during said executing; and
    installing on the storage node one or more partitions of the additional database and the additional SLA.

2. The method of claim 1, further comprising:
    recording a snapshot of database contents on the storage node; and
    loading the snapshot of database contents onto the test storage node prior to replaying the snapshot of database operations.

3. The method of claim 1, further comprising, after said installing:
    monitoring operations of the multiple databases and the additional database; and
    if a database's operations are determined to violate a first SLA associated with the database, selectively rejecting one or more new connections to the database.

4. The method of claim 1, wherein said monitoring comprises:
    for each of the application-level metrics, identifying a maximum exhibited by the additional database during execution of the additional set of operations.

5. The method of claim 4, wherein the additional SLA comprises the maximums of each of the application-level metrics exhibited by the additional database during execution of the additional set of operations.

6. The method of claim 1, further comprising, after said installing:
    recording a second snapshot of database operations on the storage node, encompassing the multiple databases and the additional database;
    replaying the second snapshot of database operations on the test storage node; and
    modifying the SLAs of one or more databases hosted on the storage node based on metrics exhibited by the one or more databases during replaying of the second snapshot.

7. The method of claim 1, further comprising, after said installing:
    on the storage node, monitoring compliance of each of the multiple databases and the additional database with their corresponding SLAs.

8. The method of claim 1, wherein the application-level metrics include at least one of: a maximum number of read operations; a maximum number of write operations; a maximum size of a read operation; and a maximum size of a write operation.

9. The method of claim 1, wherein the application-level metrics include at least one of: a maximum number of database operations per predefined time period; and a maximum number of database records accessed per predefined time period.

10. The method of claim 1, wherein the application-level metrics include a maximum number of unique database records.

11. The method of claim 1, wherein each of the multiple databases and the additional database are accessed by different applications.

12. A computer-readable medium storing instructions that, when executed by a processor, cause the processor to perform a method comprising: recording a snapshot of database operations on a storage node hosting partitions of multiple databases, wherein separate service-level agreements (SLAs) for each database limit operations of the database according to a plurality of application-level metrics; on a test storage node: prior to said recording, benchmarking the test storage node to identify maximum thresholds associated with the storage node, wherein a hardware configuration of the test storage node is substantially identical to a hardware configuration of the storage node; after said recording, replaying the snapshot of database operations; while replaying the snapshot of database operations, executing an additional set of operations on an additional database installed on the test storage node but not installed on the storage node prior to said replaying;
    determining whether the application-level metrics exhibited by the test storage node during said replaying exceed the maximum thresholds associated with the storage node; and
    automatically generating an additional SLA for the additional database, based on metrics exhibited by the additional database during said executing; and installing on the storage node one or more partitions of the additional database and the additional SLA.

13. A system for hosting multiple databases accessed by multiple applications, the system comprising: multiple storage nodes, each storage node comprising: one or more processors; a discrete portion of each of the multiple databases; and for each of the multiple databases, a database-specific service-level agreement (SLA) identifying, for each of a plurality of application-level metrics, a maximum permitted by the database on the storage node; a test node, comprising: a processor; benchmark logic comprising instructions that, when executed by the test node processor, cause the test node to determine maximum thresholds of the test node for each of the plurality of application-level metrics; first logic comprising instructions that, when executed by the test node processor, cause the test node to execute a merged sequence of operations that include: (a) operations recorded on a first storage node and involving the discrete portion of each of the multiple databases stored on the first storage node, and (b) operations of an additional database not included in the multiple databases; and second logic comprising instructions that, when executed by the test node processor during execution of the merged sequence of operations, cause the test node to determine whether execution of the merged sequence of operations causes the test node to exceed the maximum thresholds for any of the application-level metrics; a controller for generating one or more routing tables for mapping contents of each database to a storage node comprising the content; and one or more routers configured to apply the one or more routing tables to route database operations to the multiple storage nodes.

14. The system of claim 13, wherein a first storage node further comprises recording logic that, when executed by the one or more processors of the first storage node, causes the first storage node to:
record a set of operations involving the discrete portion of each of the multiple databases stored on the first storage node.

15. The system of claim 14, wherein the second logic of the test node further comprises instructions that, when executed by the test node processor during execution of the merged sequence of operations, cause the test node to, for each of the plurality of application-level metrics, identify a maximum exhibited during the operations of the additional database.

16. The system of claim 15, wherein the test node further comprises: third logic comprising instructions that, when executed by the test node processor, cause the test node to automatically generate an SLA for the additional database;
wherein the SLA is based on the maximum application-level metrics exhibited during the operations of the additional database.

17. The system of claim 14, wherein the test node is configured substantially identical to at least one of the multiple storage nodes.

18. An apparatus, comprising:
one or more processors; a plurality of persistent storage devices; and a memory storing instructions that, when executed by the one or more processors, cause the apparatus to: benchmark multiple metrics to determine a maximum threshold of the apparatus for each metric; simultaneously execute (a) a first set of database operations recorded on a storage node computer hosting partitions of multiple databases and (b) a second set of database operations for an additional database not hosted on the storage node computer; monitor, for each of the metrics, during the simultaneous execution of the first set of database operations and the second set of database operations: the metrics exhibited by the apparatus; and
the maximum metrics exhibited by the additional database; determine whether the metrics exhibited by the apparatus exceed the maximum thresholds of the apparatus; and if the metrics exhibited by the apparatus do not exceed the maximum thresholds of the apparatus, automatically generate a policy for hosting the additional database on the storage node computer, wherein the policy is based on the maximum metrics exhibited by the additional database; wherein the storage node computer is configured substantially identical to the apparatus.

19. The system of claim 16, wherein a first storage node further comprises: installation logic comprising instructions that, when executed by a processor of the first storage node, cause the first storage node to install one or more partitions of the additional database on the first storage node;
wherein operation of the additional database on the first storage node is subject to the SLA.

20. The system of claim 13, wherein the application-level metrics include at least one of: a maximum number of read operations; a maximum number of write operations; a maximum size of a read operation; a maximum size of a write operation; a maximum number of database operations per predefined time period; and a maximum number of database records accessed per predefined time period.

* * * * *